United States Patent [19]
Rusch et al.

[11] 3,923,129
[45] Dec. 2, 1975

[54] CONTROL FOR HYDROSTATIC TRANSMISSION AND BRAKE

[75] Inventors: Allan C. Rusch, Livonia; John Bubak, Warren, both of Mich.

[73] Assignee: Massey-Ferguson, Inc., Detroit, Mich.

[22] Filed: Mar. 25, 1974

[21] Appl. No.: 454,331

Related U.S. Application Data

[63] Continuation of Ser. No. 194,255, Nov. 1, 1971, abandoned.

[52] U.S. Cl. .................................. 192/4 B; 60/436
[51] Int. Cl.² ................... B60K 29/02; F16D 31/02
[58] Field of Search....... 192/4 B, 4 C; 60/435, 436, 60/441

[56] References Cited
UNITED STATES PATENTS

| | | | |
|---|---|---|---|
| 3,339,363 | 9/1967 | Quayle | 192/4 B |
| 3,349,860 | 10/1967 | Ross | 192/4 B |
| 3,354,981 | 11/1967 | Swanson et al. | 192/4 B |
| 3,366,423 | 1/1968 | Biabaud | 303/50 |
| 3,390,523 | 7/1968 | Heidemann et al. | 192/4 B |
| 3,517,790 | 6/1970 | Damon | 192/4 B |
| 3,542,173 | 11/1970 | Kratzenberg et al. | 192/4 B |
| 3,645,368 | 2/1972 | Blaauw | 192/4 B |

FOREIGN PATENTS OR APPLICATIONS

| | | | |
|---|---|---|---|
| 1,425,837 | 1/1969 | Germany | 192/4 B |
| 1,225,654 | 3/1971 | United Kingdom | 192/4 B |

Primary Examiner—Benjamin W. Wyche
Attorney, Agent, or Firm—George C. Bower

[57] ABSTRACT

A hydrostatic transmission speed control system for tractors and similar vehicles including a drive shaft, an input shaft, and a hydrostatic transmission for conducting power to the output shaft from the input shaft. The hydrostatic transmission includes a hydrostatic drive with a variable capacity pump having a variable angle swash plate. Adjustment of the swash plate changes the displacement of the pump and hence varies the power to the drive shaft to correspondingly vary the speed thereof. The swash plate has a position in which the net power to the drive shaft is zero. The system includes a braking circuit selectively energizable when the swash plate is in its neutral position for braking the drive shaft to stop rotation thereof. The system also includes relief valve means having a high pressure condition to relieve the high pressure side of the hydrostatic drive when the pressure exceeds a predetermined high pressure, and a low pressure condition to relieve the high pressure side of the drive at pressures less than said predetermined high pressure. The relief valve means is operable from the high to low pressure condition in response to energization of the braking circuit.

5 Claims, 6 Drawing Figures

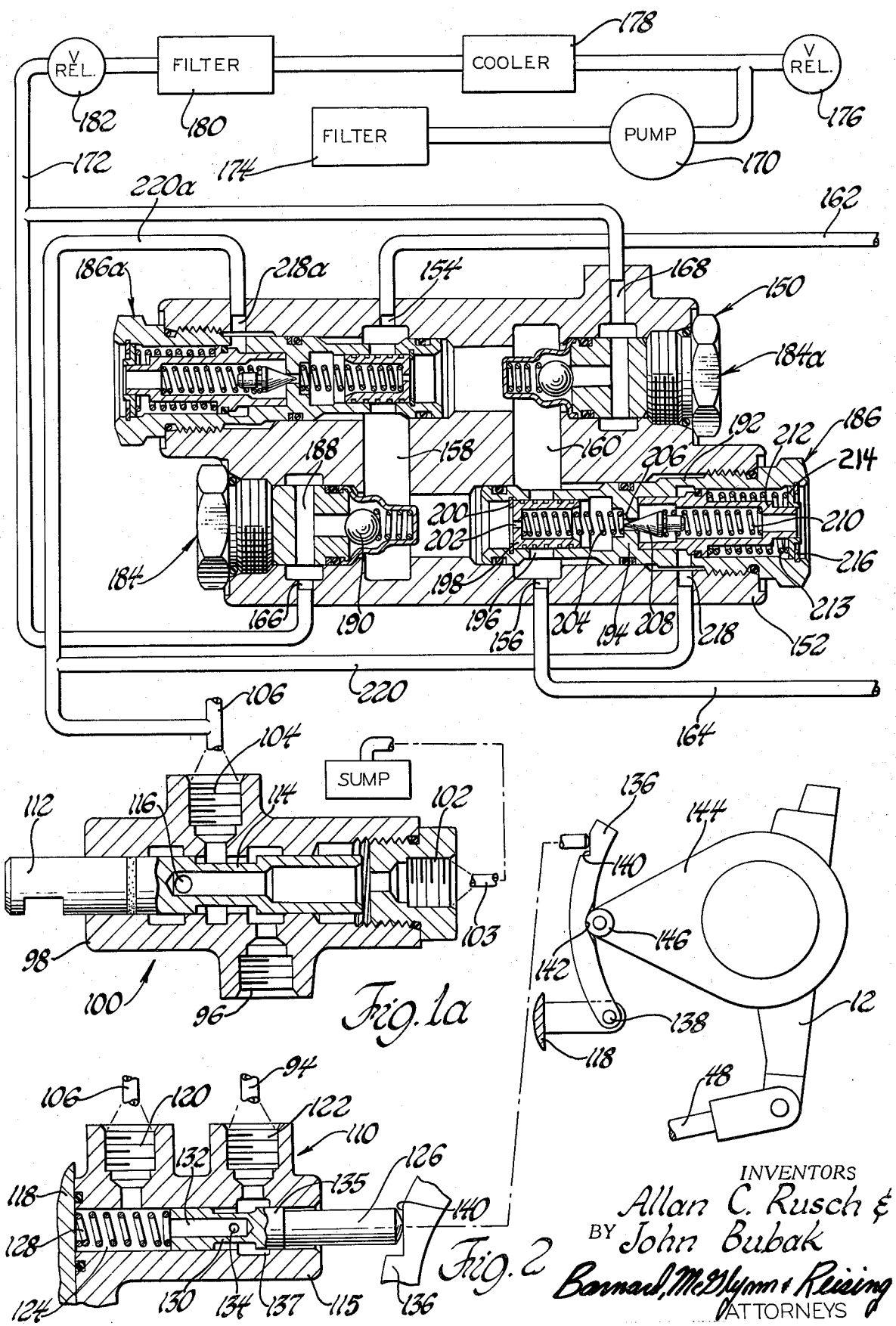

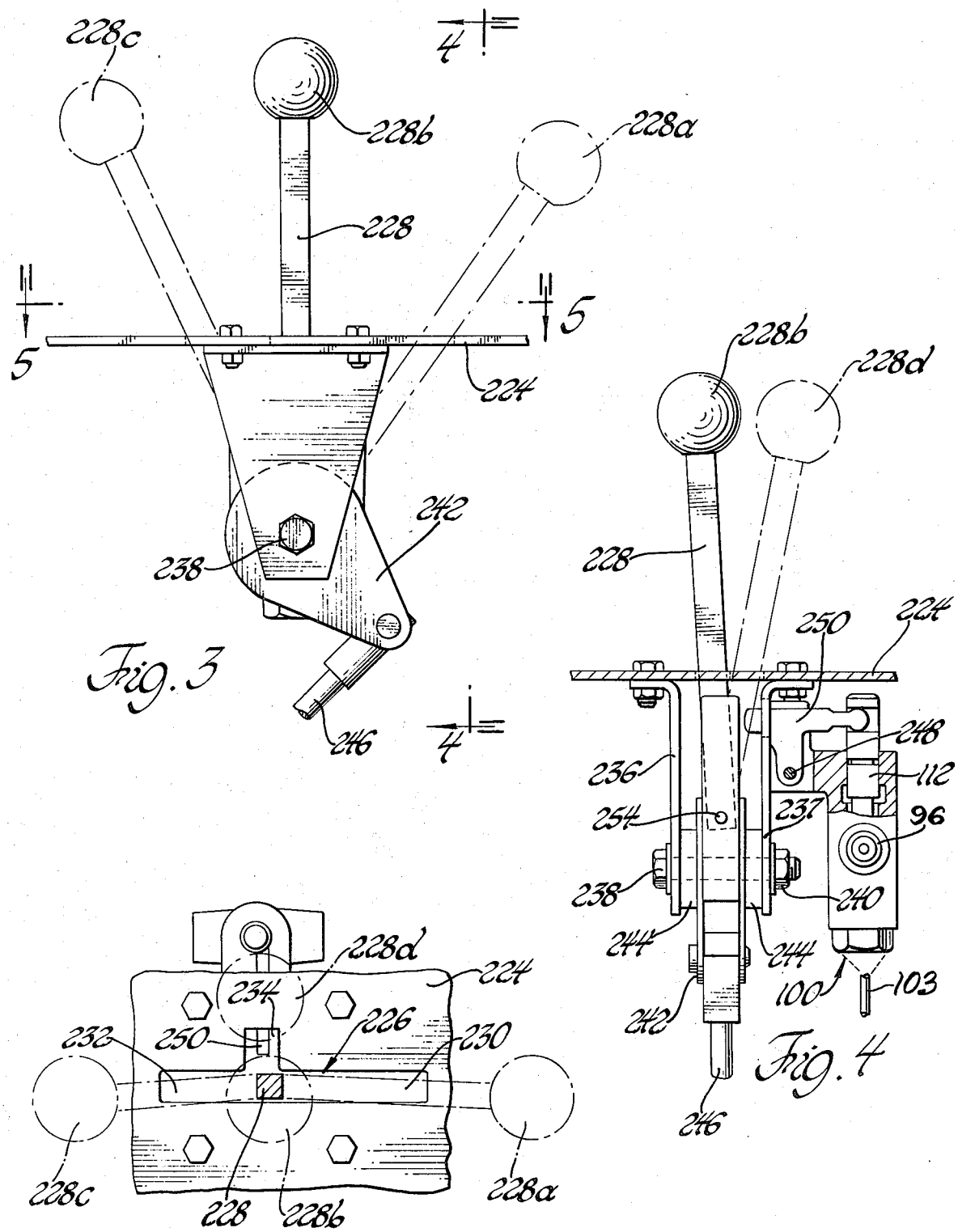

CONTROL FOR HYDROSTATIC TRANSMISSION AND BRAKE

This is a continuation of our co-pending application Ser. No. 194,255 filed on Nov. 1, 1971, now abandoned and entitled "Hydrostatic Transmission Speed Control System".

This invention relates generally to speed control systems, and is particularly concerned with hydrostatic transmission speed control systems wherein the speed of an output shaft is varied by changing the angular position of a swash plate to thereby vary the displacement of the pump portion of the hydrostatic drive.

In the operation of agricultural tractors, and similar vehicles, it is necessary that the operator be able to quickly apply the brakes to stop the vehicle. In some systems, the drive shaft of the transmission that delivers power to the drive wheels of the vehicle is braked. It is, of course, highly undesirable to apply the brakes to the drive shaft while power is being delivered to the drive shaft. It is also undesirable for the operator to accidentally begin the delivery of power to the drive shaft while the brakes are in an active condition in which case the drive shaft would be powered against the braking force.

An object of this invention is to provide a hydrostatic transmission speed control system having a braking circuit energizable when the transmission has been actuated to a zero speed condition to apply braking pressure to the drive shaft only after the transmission is in the zero speed condition.

A further object is to provide a hydrostatic transmission speed control system wherein a movable speed selector member for actuating the transmission to various speed conditions has a neutral position to actuate the transmission to a zero speed condition and a braking circuit is energizable by manipulation of the speed selector member in its neutral position to apply braking pressure to the drive shaft only after the transmission has reached the zero speed condition called for by the neutral setting of the speed selector member.

A further object is to provide a hydrostatic transmission speed control system having a speed selector member for actuating the transmission to various speed conditions, the speed selector member having a neutral position to actuate the transmission to a zero speed condition, and a braking circuit energizable to apply braking pressure to the transmission output shaft only when the transmission has been actuated to a zero speed condition with a lockout mechanism operatively connected with the swash plate controlling the speed of the transmission output shaft for preventing the admission of brake fluid to the brake until the swash plate reaches the zero speed position called for by the neutral position of the control member.

A still further object is to provide a hydrostatic transmission speed control system including a braking circuit energizable only when the transmission has been actuated to a zero speed condition to apply braking pressure to the transmission output shaft when the transmission has assumed a zero speed condition and including a relief valve controlling the high pressure side of the pump portion of the hydrostatic drive connected in the braking circuit such that the closing force on the relief valve is reduced when the braking circuit is energized to reduce the pressure required to open the relief valve.

In carrying out the foregoing, and other objects, a system according to the present invention includes a drive shaft driven by a hydrostatic transmission, the hydrostatic transmission having a variable capacity pump with a variable angle swash plate controlling the displacement of the pump and hence the speed of the drive shaft. The swash plate has a zero speed position in which the net power to the drive shaft is zero. The swash plate is actuated through a hydraulic servo system by a movable speed selector member having a neutral position in which the swash plate is actuated to a zero speed condition. The system includes a hydraulic braking circuit which is selectively energizable only when the speed selector member is in its neutral position to apply braking pressure to the drive shaft only when the transmission is in a zero speed condition.

A lockout mechanism is connected in the braking circuit and prevents transmission of braking pressure to the drive shaft until the swash plate has reached its zero speed condition.

The system further includes a relief valve controlling the high pressure side of the transmission and connected in the braking circuit so that upon energization of the braking circuit, the pressure required to open the relief valve is instantaneously reduced so that the power transmitting capability of the transmission is interrupted.

Other objects, advantages and features of the invention will become apparent from the following description taken in connection with the accompanying drawings in which:

FIG. 1a is a portion of a schematic diagram of a hydrostatic speed control system according to the present invention;

FIG. 2 is a diagrammatic view of a lockout mechanism, partially in section, of the system of FIGS. 1a and 1b;

FIG. 3 is an elevational view of the speed selector mechanism for actuating the system of FIGS. 1a and 1b to various speed conditions;

FIG. 4 is a view taken on lines 4—4 of FIG. 3; and

FIG. 5 is a view taken on lines 5—5 of FIG. 3.

Figure 1B:
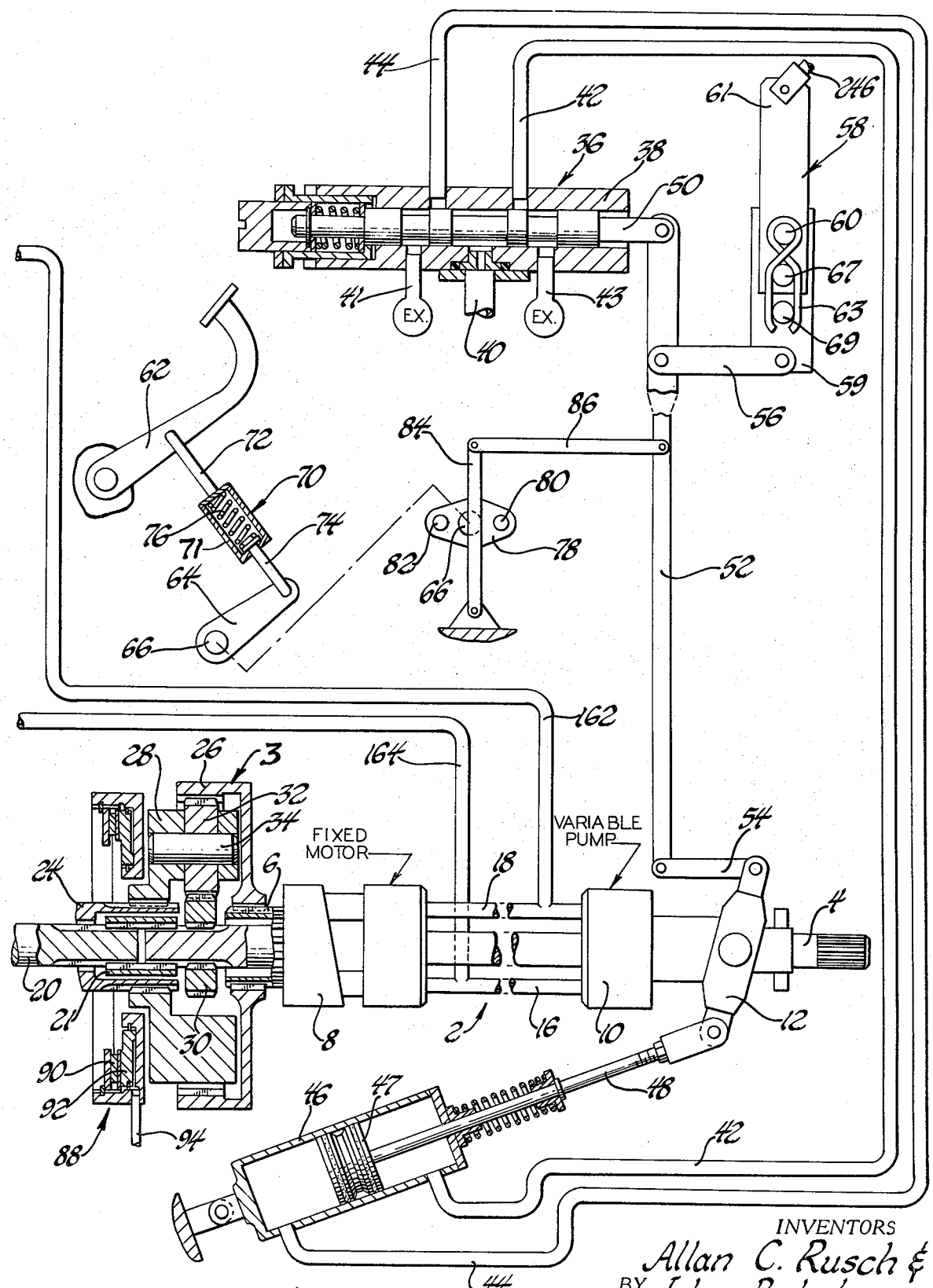
FIG. 1b is the other portion of the schematic diagram of the system of FIG. 1a, FIG. 1a constituting the left-hand portion and FIG. 1b constituting the right-hand portion of the system.

The hydrostatic drive 2 includes a hydraulic motor 8 and a variable capacity pump 10. The hydraulic motor 8 in the illustrated embodiment is a fixed capacity motor, although it is of course within the scope of the invention to use a hydrostatic drive having a variable capacity motor. The output shaft 6 is driven by the motor 8 at a speed determined by the displacement of the pump 10. The displacement of the pump 10 is in turn determined by the angular position of a swash plate 12. Thus, the speed of the output shaft 6 with respect to the input shaft 4 is determined by the position of the swash plate 12.

The hydrostatic drive 2 is of a conventional construction. The pump 10 is connected with the motor 8 through lines 16 and 18. When the swash plate 12 is positioned to one side of a zero displacement setting, high pressure fluid is delivered from pump 10 through line 16, and low pressure fluid is returned from the motor to the pump through line 18. Conversely, when the swash plate 12 is positioned angularly to the other side of a zero displacement setting, high pressure fluid is delivered by the pump 10 through line 18 and low pressure fluid returns to the pump through line 16. Reversal of the flow through lines 16 and 18 of course results in reversal of the direction of rotation of the output shaft 6.

The input shaft 4 is driven constantly by the power plant and is directly coupled through a coupler 21 to a power take-off shaft 20 so that the power take-off shaft 20 is constantly rotated during operation of the power plant at a speed proportional to the speed of the power plant. The input shaft 4, as illustrated, extends concentrically through the pump 10, motor 8 and output shaft 6.

The output shaft 6 and the input shaft 4 are connected with a drive shaft 24 through a planetary gear assembly 3. The planetary gear assembly 3 includes a ring gear 26 splined to the output shaft 6, a planet carrier 28 splined to the drive shaft 24, and a sun gear 30 splined to the input shaft 4. A planet gear 32 is rotatably mounted on a pin 34 of the planet carrier 28, the planet gear 32 being meshed with the ring gear 26 and the sun gear 30. The planet carrier 28 is thus driven by both the sun gear 30 and the ring gear 26.

The speed and direction of rotation of the planet carrier 28 is determined by the combined effect of the sun gear 30 and the ring gear 26. If the swash plate 12 is in the zero displacement positin, that is, the position in which the displacement of the pump 10 is zero, the output shaft 6 and hence the ring gear 26 will be stationary and the planet carrier 28 will be driven solely by the sun gear 30. If the swash plate 12 is in a position such that the ring gear 26 is driven by the output shaft 6 in a reverse direction with respect to the sun gear 30, the speed and direction of rotation of the planet carrier 28 wll be determined by the difference in the speed of the ring gear 26 and sun gear 30. The zero speed position of the swash plate 12 is thus the position in which the ring gear 26 is driven in reverse with respect to the sun gear 30 an amount such that the planet carrier 28, and hence the drive shaft 24, remain stationary so that the net power delivered to the drive shaft 24 from the input shaft 4 is zero.

The position of the swash plate 12 is controlled by a conventional servo system including a servo value 36 having a valve body 38 with a supply port connected with a supply line 40. Supply line 40 is connected with a source of hydraulic pressure. Valve body 38 is connected by lines 42 and 44 with a cylinder 46 on opposite sides of a piston 47. The piston 47 has a rod 48 projecting from the cylinder 46, and rod 48 is pivotally connected with the swash plate 12 on one side of its rotary axis. Spool 50 is slidably mounted in the valve body 38 and controls communication between lines 42 and 44 and the supply line 40. In the position shown, lines 42 and 44 are respectively connected with exhaust lines 43 and 41 and the supply line 40 is shut off from communication with either of lines 42 and 44 by lands on the valve 50. Movement of the valve 50 to the right as viewed in FIG. 1b connects line 42 with the supply line 40 to admit oil to the right-hand side of piston 47 and cause clockwise rotation of the swash plate 12. Conversely, movement of the spool 50 to the left as viewed in FIG. 1b connects line 44 with the supply line 40 to cause the swash plate to rotate in a counterclockwise direction.

Control spool 50 is pivotally connected with one end of a link 52, the other end of link 52 being pivotally connected with the swash plate 12 on the opposite side of the rotary axis from the connection between the swash plate 12 and the piston rod 48. A link 56 has its opposite end pivotally connected with link 52 and the lower end of an operating lever member 59 forming part of an operating lever assembly 58 which is rotatable about a shaft 60. The operating lever assembly includes a lever member 61 nonrotatably mounted on shaft 60. Rotation of the operating lever assembly 58 in a clockwise direction causes valve 50 to move to the left as viewed in FIG. 1b, and rotation of the operating lever assembly in a counterclockwise direction causes the control spool 50 to move to the right as viewed in FIG. 1b.

Links 52 and 54 constitute a follow-up linkage to return the valve to the neutral position wherein oil is trapped in both lines 42 and 44 by the lands of valve 50 so that there is no movement of the piston 47, and hence the swash plate 12. For example, rotation of the operating lever assembly 58 in a counterclockwise direction from the position illustrated in FIG. 1b causes control spool 50 to move from the neutral position shown to a position in which line 42 is connected with the supply line 40, and line 44 is connected with the exhaust line 41 to cause piston 47 to move toward the left resulting in a clockwise rotation of the swash plate 12. As swash plate 12 rotates in a clockwise direction, link 52 pivots in a counterclockwise direction about its connection with link 56 to return the control spool 50 to the neutral position so that the swash plate 12 stops at a position corresponding to the position of lever member 61.

The angular position of the lever member 61 of the operating lever assembly 58 about shaft 60 determines the setting of the swash plate 12 and hence the speed and direction of drive shaft 24. An inching mechanism is connected with the link 52, which inching mechanism is operable upon actuation by the operator to actuate the control valve 50 to cause the swash plate to move to the zero speed position in any setting of lever member 61. The inching mechanism includes a foot pedal 62 connected with a lever 64 mounted on a shaft 66 through a linkage assembly 70. The linkage assembly 70 includes links 72 and 74 respectively pivotally connected with the foot pedal 62 and lever 64, and connected together by a spring 76 received in a spring housing 71 carried by link 72. Mounted on one end of shaft 66 is plate 78, and a pair of pins 80 and 82 project axially from the plate 78 on opposite sides of shaft 66 in parallel relationship with shaft 66.

Pins 80 and 82 project on opposite sides of a link 84, one end of which is pivotally connected to a fixed portion of the vehicle and the other end of which is connected with one end of a link 86. The other end of link 86 is pivotally connected with link 52. Depression of foot pedal 62 causes clockwise rotation of lever 64 and hence shaft 66. Lever member 59 is rotatably mounted on shaft 60 and is yieldably engaged with lever member 61 through a spring clip 63. Pins 67 and 69 on levers 61 and 59, repsectively engage spring clip 63 to bias lever 59 into alignment with lever 61. When link 56 is forced to move to the left in FIG. 1b by foot pedal 62, lever member 59 pivots about shaft 60 and lever 61 remains stationary. Pins 80 and 82, acting through links 84, 86 and 52 cause the control spool 50 to move to a position to actuate the swash plate 12 to its neutral position. When the foot pedal 62 is released, the swash plate returns to the position corresponding to the setting of lever 61. Thus, in any speed of the transmission the operator can interrupt the power to drive shaft 24 by depressing the foot pedal 62, and can thus inch the vehicle without changing the speed setting of the transmission.

A conventional hydraulic brake assembly 88 is connected with the drive shaft 24 and includes a brake element 90 secured to the drive shaft 24 and a fixed brake element 92 engageably with the movable brake element 90 to apply braking force to the drive shaft 24. When fluid pressure is admitted through line 94 to the brake assembly 88, brake element 92 is urged into braking engagement with the brake element 90 to retard and stop rotation of the drive shaft 24. The brake assembly 88 is connected through line 94 to a hydraulic braking circuit.

The hydraulic braking circuit includes a brake actuating valve 100 (FIG. 1a) having a valve body 98 formed with a supply port 96, a delivery port 104, and an exhaust port 102. The supply port 96 is connected with a supply of hydraulic fluid under pressure. The exhaust port 102 is connected with sump through a line 103. The delivery port 104 is connected through a line 106 with swash plate lockout mechanism 110 (FIG. 2).

Slidably mounted in the brake valve body 98 is a plunger 112 having a hollow portion with a reduced section 114 and a cross port 116 communicating with the hollow interior of the plunger 112. Brake valve 100 is illustrated in FIG. 1a in the active position in which the supply port 96 is connected with the delivery port 104 to deliver hydraulic pressure through line 106 to the lockout mechanism 110 and ultimately to the brake assembly 88 in a manner to be set forth below. Movement of the plunger 112 to the left to an inactive position shuts off communication between the supply port 96 and delivery port 104, and connects delivery port 104 through the cross port 116 with the exhaust port 102.

The lockout mechanism 110 includes a body member 116 mounted on a stationary support 118. The body member 116 includes an inlet port 120 connected with line 106 and an outlet port 122 connected with line 94 to the brake 88. Ports 120 and 122 each communicate with a bore 124 extending through the body member 116. Communication betwen ports 120 and 122 is controlled by a locking plunger 126 slidably mounted in the bore 124, the inner end of the locking plunger 126 engaging a spring 128 received in the bore 124. The locking plunger 126 includes a reduced portion 130 and a passage 132 extending from the inner end of the plunger 126 through the reduced portion and communicating with a cross port 134.

In the active or locking position of the locking plunger 126, that is, the position illustrated in FIG. 2, port 120 is in fluid communication with port 122 through passage 132 and the cross port 134. Movement of the locking plunger 126 to the left to an inactive or unlocked position shuts off communication between port 120 and 122 since the land 135 will be positioned to the left of the enlarged portion 137 of the bore 124.

Springs 128 biases plunger 126 into engagement with a locking lever 136 pivotally connected at 138 to a support bracket. The locking lever 136 is formed with a notch 140 engaged by the outer end of plunger 126. Formed intermediate the ends of locking lever 136 is a cam profile in the form of a locking recess 142 engageable by a follower 146 carried by a locking arm 144. The locking arm 144 is secured to the swash plate 12 and is positioned such that the follower 146 can engage the locking recess 142 only when the swash plate 12 is in the zero speed position in which the net power to the drive shaft 24 is zero.

Thus, actuation of the brake valve 100 to the active condition shown in FIG. 1a causes hydraulic fluid to flow through line 106 to the lockout mechanism 110. The fluid cannot flow through line 94 to the brake assembly until swash plate 12 assumes the zero speed position illustrated in FIG. 2 with follower 146 engaged with the locking recess 142 since any other position of the follower 146 on the locking lever 136 will maintain plunger 126 in the unlocked or inactive position preventing communication between ports 120 and 122. When the swash plate 12 reaches the zero speed position of the output shown in FIG. 2, the engagement of follower 146 in the cam recess 142 together with the combination of the hydraulic pressure from port 120 and the spring force of spring 128 moves plunger 126 to the position shown in FIG. 2 allowing hydraulic fluid flow from the brake valve 100 to the brake assembly 98.

The fluid pressure in lines 16 and 18 of the hydrostatic drive is controlled by a relief valve assembly 150 having a main housing 152. Housing 152 is formed with ports 154 and 156, respectively, connected with lines 162 and 164 which in turn are, respectively, connected with lines 18 and 16. Housing 152 is also formed with charging ports 166 and 168 communicating through a line 172 with a charging pump 170. The intake side of pump 170 is connected through a filter 174 with a reservoir of hydraulic fluid. The pump 170 discharges fluid into line 172 through a cooler 178, a filter 180 and a pressure regulator 182. Line 172 is also controlled by a relief valve 176.

The main housing 152 is formed with chambers 158 and 160, and check valve assemblies 184 and 184a are threadedly mounted in the housing to control communication between port 166 and chamber 158 and between port 168 and chamber 160, respectively. The maximum pressure in chamber 158 is controlled by a two-stage relief valve assembly 186 threadedly mounted in housing 152, and the maximum pressure in chamber 160 is controlled by a two-stage relief valve assembly 186a identical to the relief valve assembly 186.

The check valve assembly 184 includes a fitting formed with a T-shaped port 188 providing communication between port 166 and chamber 158. A ball check valve 190 controls port 188 and hence controls communication between port 166 and chamber 158. When the pressure in chamber 158 is less than the pressure in port 188, the ball check valve 190 admits additional hydraulic oil into chamber 158 from port 166. Similarly, the corresponding check valve assembly 184a controls communication between port 168 and chamber 160.

The relief valve assembly 186 includes a hollow, cylindrical or cartridge shaped housing 192 formed with a transverse partition 194. A cross port 196 in housing 192 constitutes a relief port which provides communication between chambers 158 and 160. Port 196 is controlled by a relief valve piston 198 slidably mounted in the housing 192 on the left-hand side of a partition 194 as viewed in FIG. 1a. Valve 198 is biased by a spring 204 to a closed position seated against a snap ring 200. The end wall of valve element 198 is formed with an orifice 202.

The partition 194 is formed with a pilot port 206 which is controlled by a poppet valve 208 and which is large with respect to orifice 202. The poppet valve 208 is biased to a closed position with respect to port 206 by a spring 210 seated against a shoulder formed in a hollow piston 212 slidably mounted in housing 192. Piston 212 is biased toward engagement of partition 194 by a spring 213, one end of which is seated against an annular spring seat member 214 which in turn is retained in the housing 192 by a snap ring 216.

The hollow piston 212 is exposed to the pressure in a port 218 formed in the main housing 152 of the assembly 150, and port 218 is in turn connected with the delivery port 104 of the brake valve 100 through a line 220. Consequently, when there is no pressure in line 220, piston 212 is seated against partition 194 and the closing force on the poppet valve 208 is at a maximum. When line 220 is pressurized, the piston 212 moves to the right as viewed in FIG. 1a to reduce the closing force on the poppet valve 208 since spring 213 is compressed by the hydraulic pressure from port 218.

The hydraulic fluid in chamber 158 flows through the orifice 202 into the sleeve valve element 198. When port 206 is closed by the poppet valve 208, the pressure on both sides of orifice 202 is equalized. When the poppet valve 208 opens port 206, the pressure drops on the side of orifice 202 opposite chamber 158 and the imbalance in the pressure causes sleeve valve element 198 to move to the right and connect chamber 158 with chamber 160 through ports 196.

When the swash plate 12 is in a position such that high pressure fluid is delivered through line 18, the high pressure is transmitted through line 162 to chamber 158 in the valve assembly 150. When the brake valve 100 is in the inactive position such that the delivery port 104 is connected with sump through the exhaust port 102, spring 213 is extended to hold the piston 212 seated against the partition 194, and the closing force on the poppet valve 208 is at a maximum. Consequently, the relief valve assembly 186 is in a high pressure condition. However, when the brake valve 100 is in the active position as shown in FIG. 1a, line 220, and hence port 218, is pressurized to cause the piston 212 to move to the right requiring less pressure to unseat the poppet valve 208. When piston 212 is unseated from the partition 194 by hydraulic pressure through port 218, the relief valve assembly is in a low pressure condition. Thus, activation of the brake valve 100 immediately results in changing the relief valve assemblies 186 and 186a from a high pressure condition to a low pressure condition.

With reference to FIGS. 3 through 5, a plate 224 is formed with a slot 226 for defining the path of movement of a speed selector lever 228. Slot 226 includes a forward speed portion 230, a reverse speed portion 232, and a braking portion 234. The various positions of the speed selector member 228 in the slot 226 are illustrated in phantom lines in FIG. 5. Position 228a is the maximum forward speed position, position 228b is the zero speed position, position 228c is the maximum reverse speed condition, and position 228d is the braking position.

The speed selector member 228 is mounted on a fulcrum member 242 which in turn rotatably supported on a bolt 238 extending between a pair of bracket arms 236 and 237. A nut 240 is threadedly mounted on one end of the bolt 238, and a pair of spacers 244 are mounted on the bolt 238 and located between the fulcrum member 242 and the adjacent bracket arm. Movement of the speed selector member 228 along the length of slot portions 230 and 232 causes the fulcrum member 242 to rotate about the axis of bolt 238.

A control rod 246 is pivotally connected to the fulcrum member 242 and extends into connection with the lever member 61 of the operating lever assembly 58 (FIG. 1b) so that movement of the speed selector member 228 along slot portions 230 and 232 causes corresponding movement of the operating lever assembly 58 about shaft 60.

As shown in FIG. 4, the brake actuating valve 100 is mounted on bracket 237, and the plunger 112 of brake valve 100 is engaged with an operatng link 250 pivotal about a pin 248. In FIG. 4, the plunger 112 is in the inactive position. Pivotal movement of the operating link 250 in a clockwise direction about pin 248 causes plunger 112 to move to the active position shown in FIG. 1a. Link 250 is operated by actuation of the speed selector member from position 228b to position 228d.

The speed selector member 228 is mounted on the fulcrum member 242 for pivotal movement about a pin 254 so that the speed selector member 228 can move from position 228b into the braking portion 234 of the slot 226 to actuate link 250 and energize the braking circuit. Pin 254 extends perpendicularly to the axis of bolt 238.

In operation, when the operator desires to stop the drive shaft 24, the speed selector member 228 can be quickly moved to position 228d in portion 234 of slot 226 to actuate the brake valve plunger 112 to its active position. Movement of the brake valve plunger 112 to its active position energizes the braking circuit to pressurize lines 106 and 220. As the speed selector member 228 moves to position 228b prior to its movement to position 228d, the servo valve 36 is activated to actuate the swash plate 12 to its zero speed position. Pressurization of line 106 urges the lockout plunger 126 toward the right in FIG. 2, and as soon as the follower 146 is carried by the swash plate 12 to the zero speed position, the locking lever 136 moves to its locking position with follower 146 engaged with recess 142 and permitting the flow of oil from line 106 to line 94 to brakes 88. Simultaneously with pressurization of line 106, pressure is supplied through ports 218 and 218a to the two stage relief valve assemblies 186 and 186a to reduce the closing force on the relief valves controlling communication between chambers 158 and 160.

Subsequent movement of the speed selector member 228 from position 228d causes the brake valve plunger 112 to return to the inactive position to connect line 106 with exhaust through port 116 and the exhaust port 102. Line 94 is simultaneously relieved to line 106 to relieve the braking pressure on the drive shaft 24. Subsequent movement of the swash plate 12 causes the lockout plunger 126 to retract and the lockout lever 136 to move to its unlocked position.

While a specific form of the invention has been illustrated and described in the foregoing specification and accompanying drawings, it should be understood that the invention is not limited to the exact construction shown but that various alternatives in the construction and arrangement of parts, all falling within the scope

We claim:

1. A speed control apparatus for controlling a hydrostatic transmission over a range of speed conditions including a zero speed condition comprising a hydrostatic drive and an output means, a braking circuit with a brake for applying braking pressure to said output means only upon said transmission attaining said zero speed condition characterized by said braking circuit having a mechanism comprising: a support, a lever pivotally mounted at one end on said support for movement between locking and unlocking positions; a recess in said lever; a follower on said drive having a position corresponding to each speed condition of said drive and being only engageable with said recess in the zero speed condition and an extendible and retractable plunger engageable with said lever and extendible for energization of said braking circuit.

2. A speed control apparatus for controlling a hydrostatic transmission and over a range of speed conditions including a zero speed condition comprising a hydrostatic drive and, having an output means with a brake a braking circuit for applying braking pressure to said brake upon said transmission being at said zero speed condition, characterized by two stage relief valve coupled to said hydrostatic drive and comprising: a housing formed with a transverse partition intermediate the ends thereof; a relief port in said housing on one side of said partition, a hollow relief valve piston slidably mounted in said housing controlling said relief port; a spring seated between said partition and said relief valve piston and biasing said relief valve piston to close said relief port, and means responsive to energization of said braking circuit to reduce the force urging said relief valve piston to close said relief port.

3. An apparatus as claimed in claim 2 characterized by said last named means comprising: a pilot port in said partition; a poppet valve received in said housing on the opposite side of said partition and controlling said pilot port; means biasing said poppet valve to a closed position with a predetermined maximum force when said braking circuit is deenergized and responsive to energization of said braking circuit to bias said poppet valve to a closed position with a force less than said predetermined maximum force and an orifice in the end wall of said relief valve piston for providing a pressure drop across said relief valve piston when said poppet valve is in an open position permitting flow through said pilot port.

4. An apparatus as claimed in claim 3 characterized bt said last named means comprising: a hollow piston slidably mounted in said housing; a spring seat mounted in said main housing; a first spring in said hollow piston biasing said poppet valve to a closed position against said pilot port; and a second spring in said housing seated between said annular spring seat member and said hollow piston biasing and hollow piston toward engagement with said partition and simultaneously compressing said first spring; said hollow piston being urged in the opposite direction by the pressure in said braking circuit to reduce the closing force on said poppet valve when said braking circuit is energized.

5. A speed control apparatus comprising a hydrostatic drive having a variable angle swash plate movable through a range of positions and a fluid source, a brake, a hydraulic line adapted to conduct hydraulic fluid from said source to said hydraulic brake, a mechanism having a normally inactive condition blocking flow through said hydraulic line and being operable to an active condition to permit flow through said line when said line is pressurized upstream of said mechanism when said swash plate is in a predetermined position characterized by said mechanism comprises; a support, a lever pivotally mounted at one end on said support for movement between locking and unlocking positions; a recess in said lever; a follower having a position corresponding to each speed condition of said hydrostatic drive and being engageable with said recess in the zero speed condition only; and an extendible and retractable plunger engageable with said lever and urged to extend inresponse to energization of said braking circuit to thereby urge said lever toward its locked position.

* * * * *